(12) United States Patent
Morii et al.

(10) Patent No.: US 7,003,465 B2
(45) Date of Patent: Feb. 21, 2006

(54) METHOD FOR SPEECH RECOGNITION, APPARATUS FOR THE SAME, AND VOICE CONTROLLER

(75) Inventors: Keiko Morii, Kanagawa (JP); Yoshio Ohno, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 783 days.

(21) Appl. No.: 09/975,918

(22) Filed: Oct. 12, 2001

(65) Prior Publication Data
US 2002/0133343 A1   Sep. 19, 2002

(30) Foreign Application Priority Data
Oct. 12, 2000   (JP)   ............................. 2000-311599

(51) Int. Cl.
*G10L 15/00*   (2006.01)
(52) U.S. Cl. ....................... 704/275; 704/255
(58) Field of Classification Search ................ 704/255, 704/275
See application file for complete search history.

(56) References Cited

U.S. PATENT DOCUMENTS

| 4,618,984 | A | * | 10/1986 | Das et al. ................... 704/244 |
| 4,991,216 | A |   | 2/1991  | Fujii et al. |
| 5,008,941 | A | * | 4/1991  | Sejnoha ...................... 704/222 |
| 5,150,449 | A | * | 9/1992  | Yoshida et al. ............. 704/232 |
| 5,737,487 | A | * | 4/1998  | Bellegarda et al. ......... 704/250 |
| 5,864,810 | A | * | 1/1999  | Digalakis et al. ........... 704/255 |
| 6,442,519 | B1 | * | 8/2002 | Kanevsky et al. ........... 704/243 |
| 6,567,776 | B1 | * | 5/2003 | Chang et al. ................ 704/236 |
| 6,584,439 | B1 | * | 6/2003 | Geilhufe et al. ............. 704/270 |

FOREIGN PATENT DOCUMENTS

| JP | 5-300213  | 11/1993 |
| JP | 5-341798  | 12/1993 |
| JP | 10-282986 | 10/1998 |

OTHER PUBLICATIONS

S. Nakagawa et al., "Considerations on Speaker Grouping by Sex and Age for Automatic Speech Recognition", pp. 1002-1009. (w/ English abstract).

T. Matsuoka and Chin-hui Lee, "On-Line Speaker Adaptation Using Maximum A Posteriori Estimation", pp. 39-46 (w/ English abstract).

Hisashi Wakita, "Normalization of Vowels by Vocal-Tract Length and Its Application to Vowel Identification", pp. 182-193.

A. V. Oppenheim and D. H. Johnson, "Discrete Representation of Signals", pp. 680-691.

* cited by examiner

*Primary Examiner*—Daniel Abebe
(74) *Attorney, Agent, or Firm*—RatnerPrestia

(57) ABSTRACT

An acoustic analysis unit acoustically analyzes a first utterance by a user. A pattern by-characteristic selection unit selects a trained pattern optimal for the user's utterance from a plurality of trained patterns that are previously classified and stored every characteristic. A speaker adaptation processor determines a spectral frequency distortion coefficient for correcting difference between spectral frequencies. The difference is caused by vocal tract length of a training speaker and an input speaker. Recognition of subsequent utterances using this determination improves recognition performance of the subsequent speech sounds.

36 Claims, 7 Drawing Sheets

METHOD FOR SPEECH RECOGNITION, APPARATUS FOR THE SAME, AND VOICE CONTROLLER

FIELD OF THE INVENTION

The present invention relates to a method and an apparatus for recognizing a speaker independent speech, and a voice controller including the speech recognition apparatus.

BACKGROUND OF THE INVENTION

Speech recognition methods are disclosed in Transaction of The Institute of Electronics and Communication Engineers of Japan. Vol. J63-D No. 12 pp. 1002–1009, December, 1980 and Japanese Patent Application Non-examined Publication No. H10-282986. In these speech recognition methods, speakers are previously classified by characteristics such as their ages to trained patterns.

A speaker adaptation method is also widely studied in Wakita, H. "Normalization of Vowels by Vocal-Tract Length and Its Application to Vowel Identification," IEEE (Institute of Electrical and Electronics Engineers) Trans. ASSP 25 (2): pp. 183–192 (1977). This speaker adaptation method distorts a spectral frequency of a speech sound of a speaker by using a single pattern.

A maximum a posteriori estimation (MAP estimation) or the like is known as a speaker adaptation method capable of assimilating a detailed characteristic of a speaker. Technical Report of IEICE (The Institute of Electronics, Information and Communication Engineers) Vol. 93 No. 427 pp. 39–46 (SP93-133, 1993) discloses the MAP estimation.

This method, however, has a problem that if training utterances as a sample beforehand accumulated for an adaptation are extremely few, for example, using only one utterance is spoken, the adaptation cannot improve speech recognition.

A method having a higher recognition rate of a speaker independent word recognizer is disclosed in, for example, Japanese Patent Application Non-examined Publication No. H5-341798. In this speech recognition method, a speaker speaks one of names being given to a speech recognition apparatus, and the apparatus selects a database adequate to the speaker based on the speech sounds. After that, the speaker speaks a word to be recognized, and the word is processed by speech recognition using the selected database.

This method, however, has a problem that it is necessary to always examine firstly whether or not the utterance of the speaker is the name of the device, and therefore it takes time for processing. Additionally, this conventional apparatus simply selects databases to be used for a next utterance based on the discrimination whether or not the speaker is adapted, so that a large memory capacity for storing the databases is required.

In the prior art discussed above, detailed characteristics of a speaker are hardly assimilated based on a few utterances, namely only one word or several words at the most, which results in insufficient speech recognition performance.

It is an object of the present invention to improve speech recognition performance by assimilating detailed characteristics of a speaker based on a few utterances even if a memory capacity for storing databases is small.

SUMMARY OF THE INVENTION

The present invention addresses the problems discussed above, and aims to provide a speech recognition method which comprises the steps of:

selecting, based on a first utterance by a speaker, an adaptable trained pattern from a plurality of trained patterns that are classified by the characteristics of training speakers who speaks training utterances;

finding a distortion coefficient fixed by spectral region of speech for a utterance by the speaker based on the selected trained pattern and a first utterance by the speaker; and recognizing an input utterance following the first utterance using the selected trained pattern and the distortion coefficient.

A speech recognition apparatus in coincidence with the present invention comprises the following elements:
(a) an acoustic analysis unit for acoustically analyzing an input speech sound to provide acoustic parameters;
(b) a pattern by-characteristic storage for previously holding a plurality of trained patterns classified by characteristics of training speakers;
(c) a pattern by-characteristic selection unit for selecting an adaptable trained pattern from the plurality of trained patterns based on a first utterance by a speaker;
(d) a speaker adaptation processor for obtaining a distortion coefficient fixed by spectral region of speech for acoustic parameters of the first utterance using the acoustic parameters and the trained pattern selected by the pattern selection unit;
(e) a word lexicon including known words to be recognized; and
(f) a speech recognition unit for recognizing an input speech sound following the first utterance using the distortion coefficient, the selected trained pattern, and the word lexicon.

A voice controller in coincidence with the present invention comprises the following elements:
(a) a sound input unit for receiving speech sounds;
(b) an acoustic analysis unit for acoustically analyzing a speech sound from the sound input unit to provide acoustic parameters;
(c) a pattern by-characteristic storage for previously holding a plurality of trained patterns classified by characteristics of training speakers;
(d) a pattern by-characteristic selection unit for selecting an adaptable trained pattern from the plurality of trained patterns based on a first utterance by a speaker;
(e) a speaker adaptation processor for determining a distortion coefficient fixed by spectral region of speech for acoustic parameters of the first utterance, using the acoustic parameters and the trained pattern selected by the pattern selection unit;
(f) a word lexicon including known words to be recognized; and
(g) a speech recognition unit for recognizing an input speech sound following the first utterance using the distortion coefficient, the selected trained pattern, and the word lexicon; and
(h) a control signal output unit for outputting a control signal based on a recognition result supplied from the speech recognition unit.

DESCRIPTION OF THE PREFERRED EMBODIMENTS

Figure 1:
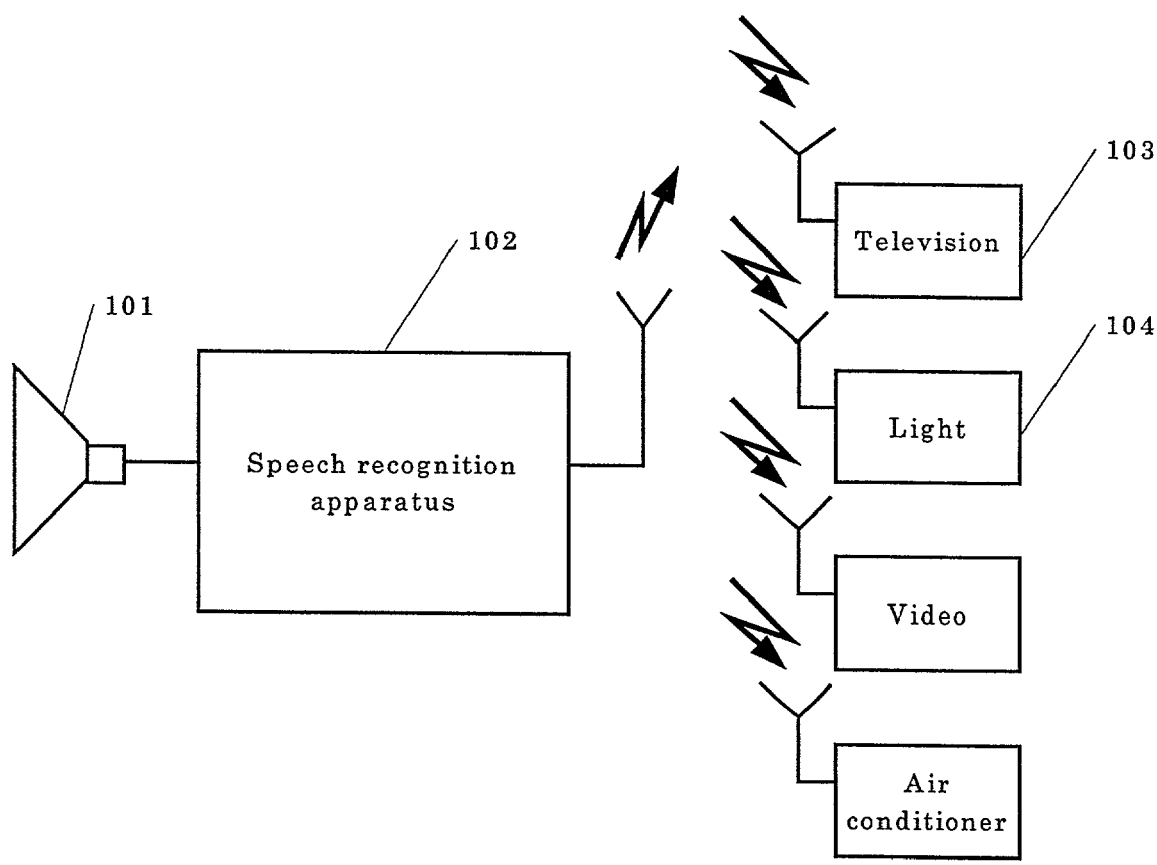
FIG. 1 is a schematic diagram of a voice control system in coincidence with a first exemplary embodiment of the present invention.

Embodiments of the present invention will be described hereinafter with reference to the accompanying drawings.

Exemplary embodiment 1

A first exemplary embodiment is shown in FIG. 1 through FIG. 5. A user speaks a word defined for pattern selection, speaker adaptation, and device selection (hereinafter called a pattern selection word). Voice controller 102 receives a speech sound of the word through microphone 101. The user subsequently speaks a word for indicating a content of controlling the device (hereinafter called a device control word) selected by the pattern selection word. When voice controller 102 receives a speech sound of the word, it outputs a control signal to the selected device.

In the present embodiment, for example, the user speaks "Television_Increase-sound" or "Light_Turn off". The utterance includes "Television" or "Light" as a pattern selection word, and "Increase sound" or "Turn off" as a device control word. Based on the utterance, voice controller 102 sends to television 103 a control signal for increasing its sound volume, or to lighting 104 a control signal for turn-off.

Figure 2:
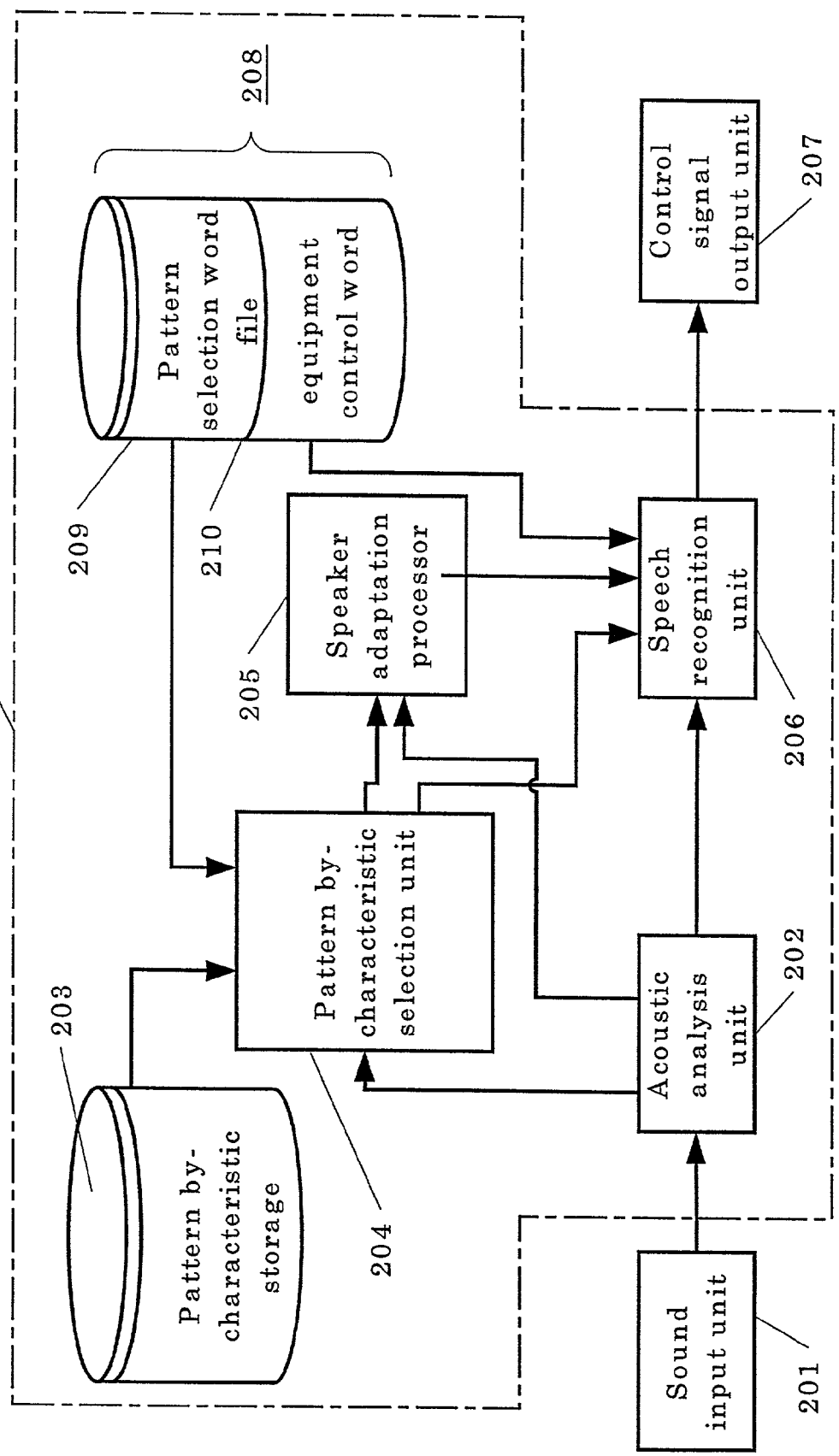
FIG. 2 is a block diagram of a voice controller in coincidence with the first exemplary embodiment.

An operation in the voice controller shown in FIG. 2 will be described hereinafter in detail.

A speech signal of a pattern selection word, namely a first utterance, fed through the microphone is converted from an analog signal to a digital signal by sound input unit 201, and supplied to acoustic analysis unit 202. Acoustic analysis unit 202 determines a linear predictive coding (LPC) cepstral coefficient vector as acoustic parameters of the speech sound digital signal. The present embodiment provides the example using the LPC cepstral coefficient vector as the acoustic parameters, but the other acoustic parameters such as mel frequency cepstral coefficients (MFCC) produce a similar advantage.

Figure 3:
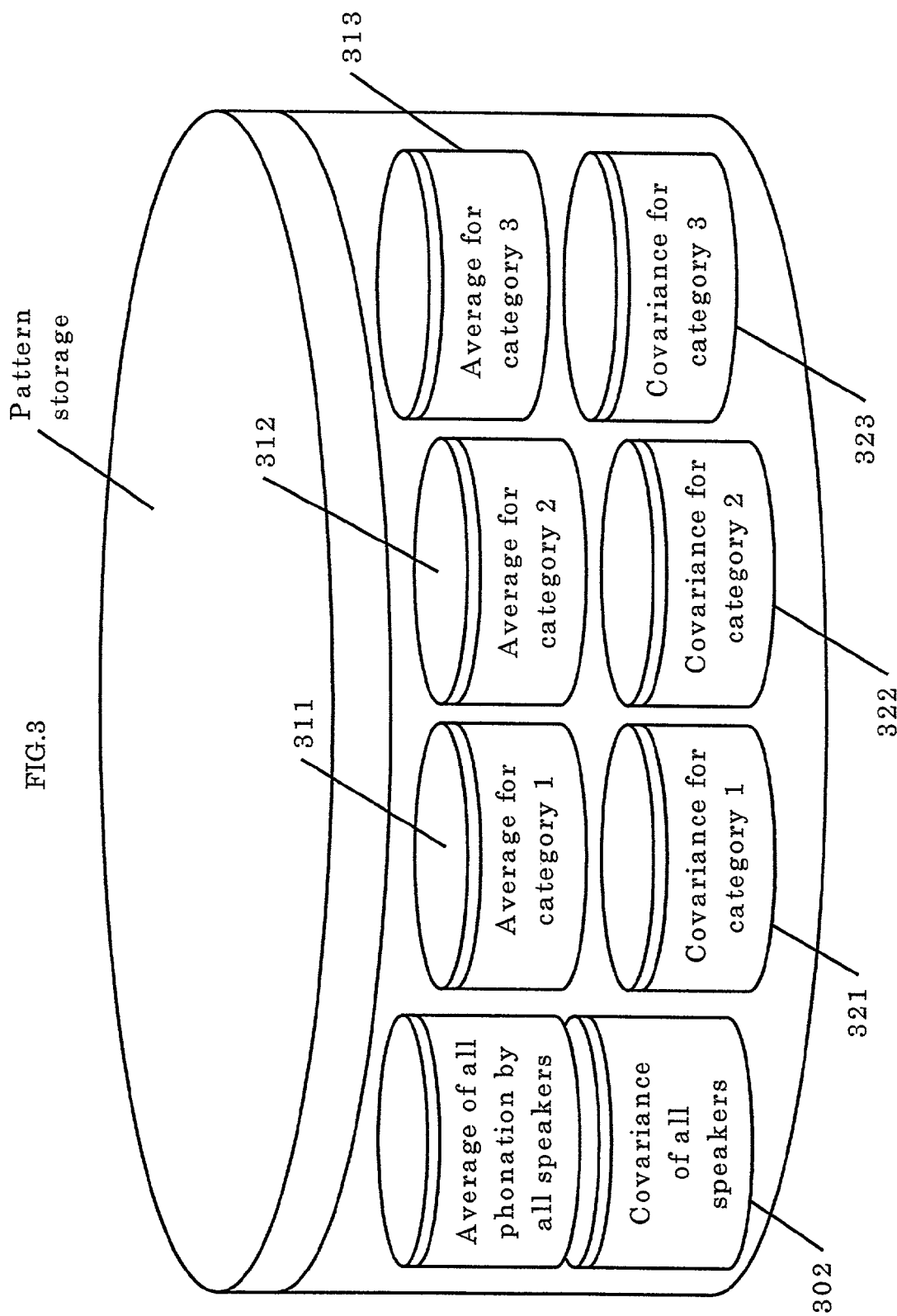
FIG. 3 is a detailed block diagram of a pattern by-characteristic storage in coincidence with the first exemplary embodiment.

FIG. 3 shows a detailed configuration of pattern by-characteristic storage 203.

The learned speech sound data stored in pattern storage 203 is previously categorized according to ages of speakers. Patterns by characteristic previously stored in pattern by-characteristic storage 203 comprise the following data:

average values of LPC cepstral coefficient vectors of utterances classified by every phonetical unit of each time by training speakers in each characteristic category;

covariance values of LPC cepstral coefficient vectors of every utterance by training speakers in each characteristic category;

average values of LPC cepstral coefficient vectors of utterances classified by every phonemes' state of each time by all training speakers; and covariance values of LPC cepstral coefficient vectors of every utterance by all training speakers.

The present embodiment uses the following three categories:

|  | Ages |
| --- | --- |
| Category 1 | –12 |
| Category 2 | 13–64 |
| Category 3 | 65– |

Pattern storage 203 stores trained patterns including the following data;

average values 301 of every utterance by all training speakers;

covariance values 302 of every utterance by all training speakers;

average values 311 of utterances by training speakers in category 1;

average values 312 of utterances by training speakers in category 2;

average values 313 of utterances by training speakers in category 3;

covariance values 321 of the utterances by the training speakers in category 1;

covariance values 322 of the utterances by the training speakers in category 2; and covariance values 323 of the utterances by the training speakers in category 3.

The LPC cepstral coefficient vector is determined by acoustic analysis unit 202. Pattern by-characteristic selection unit 204 performs a distance calculation of a first utterance part of the LPC cepstral coefficient vector using previously prepared trained patterns in pattern storage 203. Based on the resultant calculation, selection unit 204 further determines a pattern by characteristic to be used for recognizing the subsequent word. This calculation uses a linear function developed from Mahalanobis' distance as a distance measure (similarity). Mahalanobis' distance is a fundamental function, and the developed linear function is called a simplified Mahalanobis' distance. The simplified Mahalanobis' distance is disclosed in U.S. Pat. No. 4,991,216. The present embodiment uses a statistical distance measure, namely the simplified Mahalanobis' distance; however, another statistical distance measure such as Bayes' discriminant may be used. An output probability of hidden Markov model may also be used to produce the similar advantage.

Figure 4:
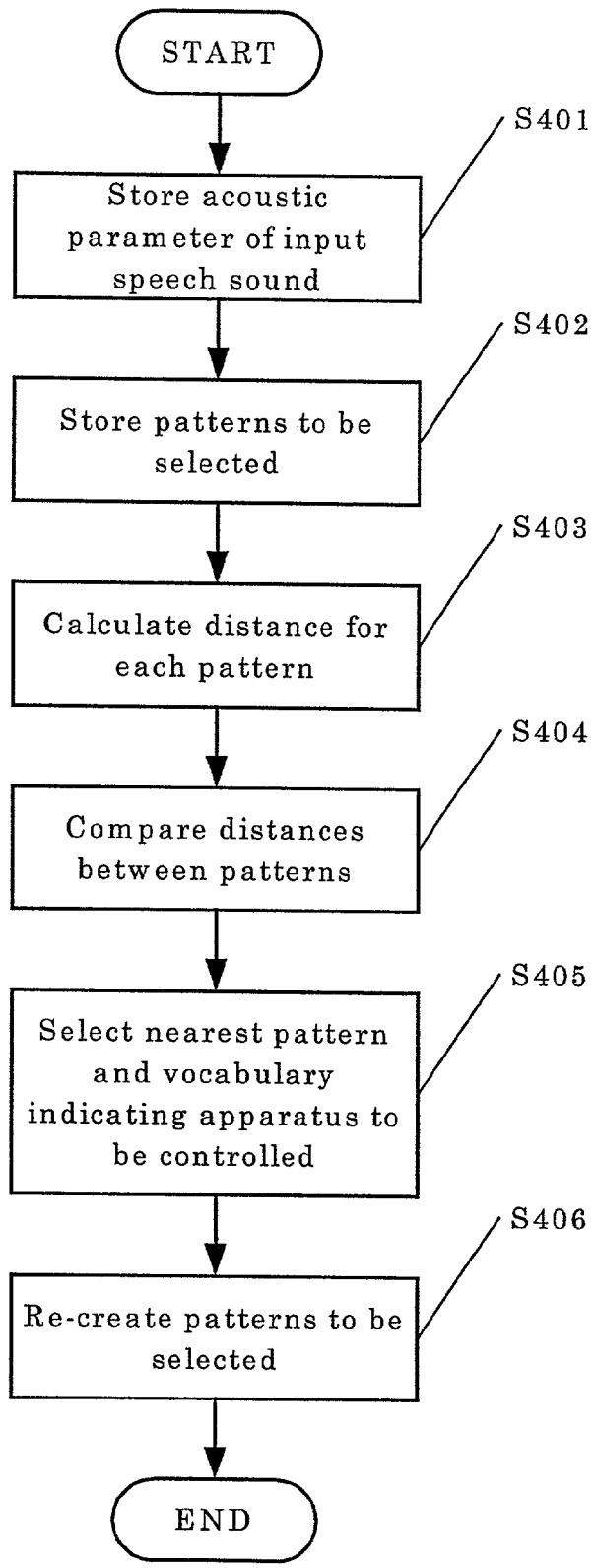
FIG. 4 is a flow chart of a process in a pattern by-characteristic pattern selection unit in coincidence with the first exemplary embodiment.

FIG. 4 is a flow chart of a process in pattern selection unit 204. Acoustic parameters of an input speech sound is read in the first step (step S401). In other words, an LPC cepstral coefficient vector obtained by acoustic analysis of the input speech sound is read in the present embodiment.

Next, patterns to be selected are read (step S402). In the present embodiment, the patterns are read from patterns stored on pattern storage 203 shown in FIG. 3. Average values 311 of utterances by training speakers in category 1, average values 301 of all utterances by all training speakers, and covariance values 302 of all utterances by all training speakers are read for category 1. Average values 312 of utterances by training speakers in category 2, average values 301 of all utterances by all training speakers, and covariance values 302 of all utterances by all training speakers are read for category 2. Average values 313 of utterances by training speakers in category 3, average values 301 of all utterances by all training speakers, and covariance values 302 of all utterances by all training speakers are read for category 3.

A distance calculation of a pattern selection word is then performed using each trained pattern (step S403). The word is used both as a selection of trained patterns to be used for recognizing the following word and a selection of a device. The distance calculation determines a distance between defined all pattern selection words and the input speech sound by a user for each trained pattern for each category read in step S402.

The distance calculation uses equation (1) of the simplified Mahalanobis' distance disclosed in U.S Pat. No. 4,991, 216.

$$L_k = \sum_{i,time} B_{k_i} - 2\vec{A}_{k_i}^t \cdot \vec{X} \quad (1)$$

where;

$$=\vec{A}_k = \vec{W}^{-1} \cdot \vec{\mu}_k - \vec{W}^{-1} \cdot \vec{\mu}_x$$

$$B_k = \vec{\mu}_k^t \cdot \vec{W}^{-1} \vec{\mu}_k - \vec{\mu}_x^t \cdot \vec{W}^{-1} \cdot \vec{\mu}_x$$

$\vec{W}^{-1}$ is inverse matrix of $\vec{W}$, $\vec{\mu}_k^t$ is transpose of a matrix of $\vec{\mu}_k$, $L_k$ is a distance between utterance of state (k) (phoneme order or time sequence) by a speaker and the trained pattern every category, $\vec{\mu}_k$ is an average value of LPC cepstral coefficient vectors of state (k) (phoneme order or time sequence) every category, $\vec{\mu}_x$ is an average value of LPC cepstral coefficient vectors of all utterances by all training speakers, $\vec{W}$ is a covariance value of LPC cepstral coefficient vectors of all utterances by all training speakers, and $\vec{X}$ is a continuous LPC cepstral coefficient vector of an input speech sound generated by a speaker.

Using trained patterns for categories 1, 2, and 3, distances $L_{1k}$, $L_{2k}$ and $L_{3k}$ are obtained in the following equations.

$$L_{1k} = \sum_{i,time} B_{1k_i} - 2\vec{A}_{1k_i}^t \cdot \vec{X}$$

where;

$$\vec{A}_{1k} = \vec{W}^{-1} \cdot \vec{\mu}_{1k} - \vec{W}^{-1} \cdot \vec{\mu}_x$$

$$B_{1k} = \vec{\mu}_{1k}^t \cdot \vec{W}^{-1} \cdot \vec{\mu}_{1k} - \vec{\mu}_x^t \cdot \vec{W}^{-1} \cdot \vec{\mu}_x$$

$$L_{2k} = \sum_{i,time} B_{2k_i} - 2\vec{A}_{2k_i}^t \cdot \vec{X}$$

where;

$$\vec{A}_{2k} = \vec{W}^{-1} \cdot \vec{\mu}_{2k} - \vec{W}^{-1} \cdot \vec{\mu}_x$$

$$B_{2k} = \vec{\mu}_{2k}^t \cdot \vec{W}^{-1} \cdot \vec{\mu}_{2k} - \vec{\mu}_x^t \cdot \vec{W}^{-1} \cdot \vec{\mu}_x$$

$$L_{3k} = \sum_{i,time} B_{3k_i} - 2\vec{A}_{3k_i}^t \cdot \vec{X}$$

where;

$$\vec{A}_{3k} = \vec{W}^{-1} \cdot \vec{\mu}_{3k} - \vec{W}^{-1} \cdot \vec{\mu}_x$$

$$B_{3k} = \vec{\mu}_{3k}^t \cdot \vec{W}^{-1} \cdot \vec{\mu}_{3k} - \vec{\mu}_x^t \cdot \vec{W}^{-1} \cdot \vec{\mu}_k$$

$\vec{\mu}_{1k}$ is an average value of LPC cepstral coefficient vectors of state (k) (phoneme order or time sequence) of an arrangement "Television" of speech sound elements for category 1, $\vec{\mu}_{2k}$ is an average value of LPC cepstral coefficient vectors of state (k) (phoneme order or time sequence) of an arrangement "Television" of speech sound elements for category 2, $\vec{\mu}_{3k}$ is an average value of LPC cepstral coefficient vectors of state (k) (phoneme order or time sequence) of an arrangement "Television" of speech sound elements for category 3, $\vec{\mu}_x$ is an average value of LPC cepstral coefficient vectors of all utterance by all training speakers, $\vec{W}$ is a covariance value of LPC cepstral coefficient vectors of all utterances by all training speakers, and $\vec{X}$ is an LPC cepstral coefficient vector when a user speaks "Television".

This distance calculation uses, as an entire distribution, all utterances by speakers in various characteristic categories as discussed above. Therefore, these equations are extremely effective for the selection of trained patterns to be selected.

The present embodiment uses four words, "Television", "Video", "Air conditioner", and "Light", as defined pattern selection words. When the pattern selection words are also used for the device selection, a number of pattern selection words is preferably the same number as controlled devices. When the pattern selection and the device selection are performed using different words, a smaller number of pattern selection words can produce the same advantage. For example, when "Instruction" is used as a pattern selection word and "Instruction_Television_Increase-sound" or "Instruction_Light_Turn off" is spoken, "Television" and "Increase sound", or "Light" and "Turn off" are used as device control words. Even one pattern selection word can thus improve recognition performance of the subsequent words.

Next, distances obtained in step S403 for the trained patterns for respective categories are compared with each other (step S404). In the present embodiment, distances $L_{1k}$, $L_{2k}$, and $L_{3k}$ obtained in step S403 are compared with each other.

Based on the comparison result in step S404, a vocabulary indicating a controlled device and a category that have the shortest distance is selected (step S405).

Patterns to be selected are reconstructed in response to the nearest pattern selected in step S405 (step S406). When the trained patterns of category 1 are selected in step S405, average values 311 of utterance by training speakers in category 1 and covariance values 321 of utterances by the training speakers in category 1 are used as the trained patterns to be selected. When the trained patterns of category 2 are selected in step S405, average values 312 of utterance by training speakers in category 2 and covariance values 322 of utterance by the training speakers in category 2 are used as the trained patterns to be selected. When the trained patterns of category 3 are selected in step S405, average values 313 of utterance by training speakers in category 3 and covariance values 323 of utterances by the training speakers in category 3 are used as the trained patterns to be selected. Now, pattern by-characteristic selection unit 204 finishes its process.

Speaker adaptation processor 205 distorts a spectral frequency on an LPC cepstral coefficient vector by Oppenheim method equation (2) using a first utterance part of the vector of the input speech sound, where the vector has been already calculated by acoustic analysis unit 202. The Oppenheim method is also disclosed in Oppenheim, A. V. and Johnson, D. H. "Discrete Representation of Signals," Proc. IEEE 60 (6): 681–691 (1972).

A distance measure of the utterance is calculated between the LPC cepstral coefficient vector, of which spectral frequency has been distorted, and a pattern arrangement corresponding to the vocabulary indicating the controlled device. The pattern arrangement has been generated using the trained patterns determined by pattern selection unit 204. In other words, LPC cepstral coefficient vector $\vec{X}^\alpha$ is obtained by distorting input LPC cepstral coefficient vector $\vec{X}$ through a filter shown by equation (2) using a frequency distortion coefficient $\alpha$. The frequency distortion coefficient providing the most similar distance of all vector $\vec{X}^\alpha$ is determined according to equation (3) in relation to LPC cepstral coefficient vector $\vec{X}^\alpha$.

$$z^{-1} = \frac{z^{-1} - \alpha}{1 - \alpha z^{-1}} \quad (2)$$

where;
$\alpha$ is a vocal tract length normalization coefficient (frequency distortion coefficient).

$$\hat{\alpha} = \underset{\alpha}{\arg\max}\, P(\vec{X}^\alpha | \alpha, \theta) \quad (3)$$

where;
P is a probability (similarity),
$\alpha$ is a vocal tract length normalization coefficient (frequency distortion coefficient),
$\vec{X}$ is an LPC cepstral coefficient vector, and
$\theta$ is a trained pattern.

Figure 5:
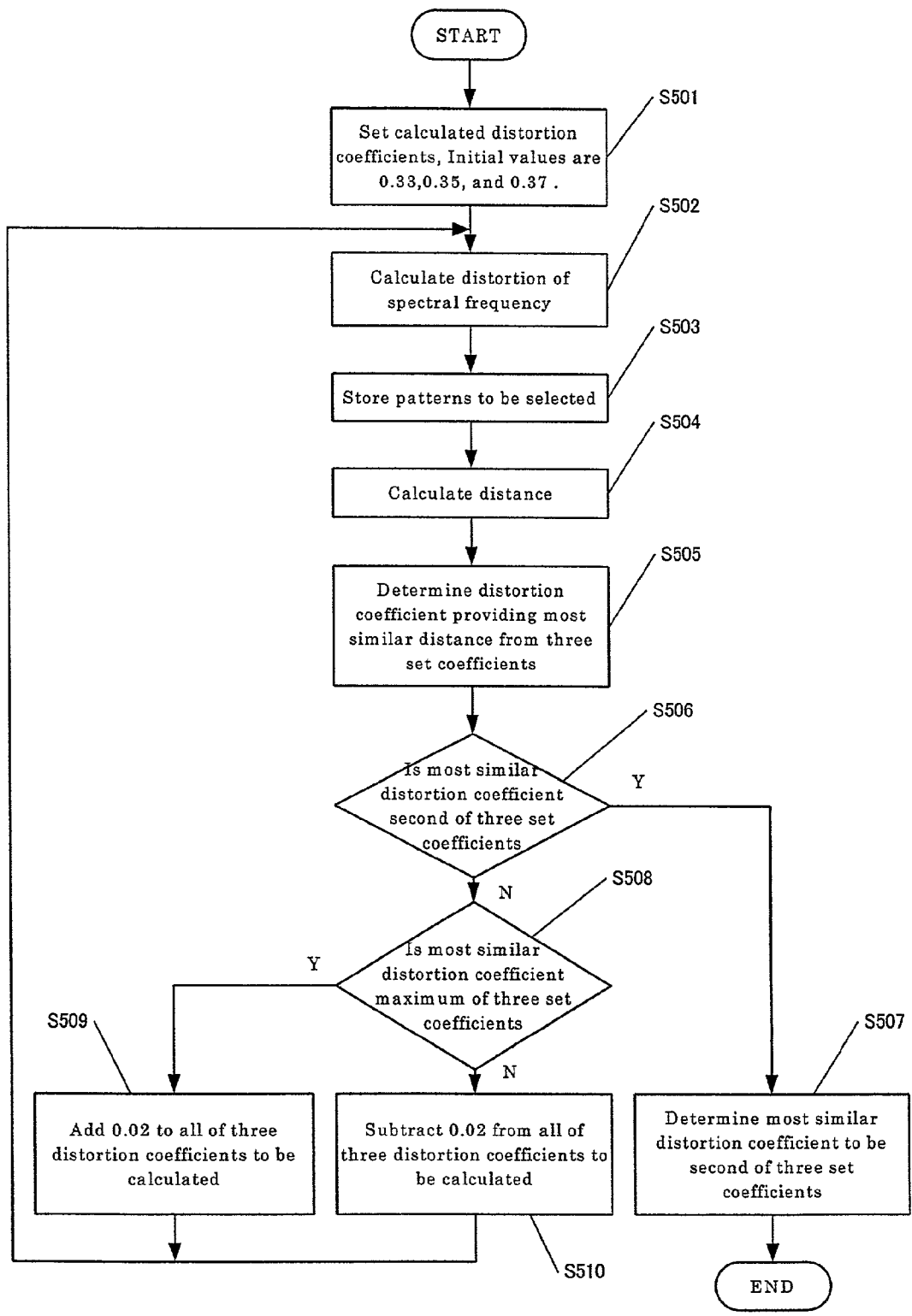
FIG. 5 is a flow chart of a process in a speaker adaptation processor in coincidence with the first exemplary embodiment.

A process by speaker adaptation processor 205 will be hereinafter described using a flow chart shown in FIG. 5.

Three initial values ($\alpha_{def} - \Delta\alpha_1$, $\alpha_{def}$, $\alpha_{def} + \Delta\alpha_1$) of distortion coefficients of spectral frequency of a calculated object are firstly set (step S501). Preferably, $\alpha_{def}$ is 0.20 to 0.50 and $\Delta\alpha_1$ is 0.005 to 0.100 when a sampling frequency of speech sounds is 10 kHz, and the present embodiment employs $\alpha_{def} = 0.35$ and $\Delta\alpha_1 = 0.02$.

Speaker adaptation processor 205 then calculates three sets of LPC cepstral coefficient vectors using spectral frequency distortioncalculation. (step S502). In this calculation, the processor 205 passes the first utterance part of the LPC cepstral coefficient vector of user's utterance through the following filter to distort the spectrum on the LPC cepstral coefficient vector (hereinafter called a spectral frequency distortioncalculation.). The filter is represented by equation (2) using the spectral frequency distortion coefficients set in step S501. The LPC cepstral coefficients of user's utterance have been already obtained by acoustic analysis unit 202.

Next, speaker adaptation processor 205 stores the trained patterns that are determined by pattern selection unit 204 and the recognition result of the vocabulary indicating a controlled device (step S503).

Next, processor 205 calculates distances between three sets of LPC cepstral coefficient vectors determined in step S502 and a pattern arrangement formed using the trained patterns that are determined in step S503, based on the recognition result obtained in step S503 (step S504). When the device selection word determined by pattern selection unit 204 is "Television" and the trained pattern belongs to category 2, the simplified Mahalanobis' distance L is described every LPC cepstral coefficient as follows;

$$L_{51k} = \sum_{i,time} B_{5k_i} - 2\vec{A}^t_{5k_i} \cdot \vec{X}_1$$

where;

$$\vec{A}_{5k} = \vec{W}^{-1} \cdot \vec{\mu}_{5k} - \vec{W}^{-1} \cdot \vec{\mu}_x$$

$$B_{5k} = \vec{\mu}^t_{5k} \cdot \vec{W}^{-1} \cdot \vec{\mu}_{5k} - \vec{\mu}^t_x \cdot \vec{W}^{-1} \cdot \vec{\mu}_x,$$

$\vec{\mu}_{5k}$ is an average value of LPC cepstral coefficient vectors of state (k) (phoneme order or time sequence) of an arrangement "Television" of speech sound elements for category 2, $\vec{\mu}_x$ is an average value of LPC cepstral coefficient vectors of all utterances by training speakers in category 2, W is a covariance value of LPC cepstral coefficient vectors of all utterances by the training speakers in category 2, and $\vec{X}_1$ is an LPC cepstral coefficient vector when the spectral frequency distortion coefficient is 0.33.

$$L_{52k} = \sum_{i,time} B_{5k_i} - 2\vec{A}^t_{5k_i} \cdot \vec{X}_2$$

where;
$\vec{X}_2$ is an LPC cepstral coefficient vector when the spectral frequency distortion coefficient is 0.35.

$$L_{53k} = \sum_{i,time} B_{5k_i} - 2\vec{A}^t_{5k_i} \cdot \vec{X}_3$$

where;

$\vec{X}_3$ is an LPC cepstral coefficient vector when the spectral frequency distortion coefficient is 0.37.

Next, speaker adaptation processor 205 discriminates-and determines a spectral frequency distortion coefficient when the most similar, namely the nearest, distance is obtained among the distances $L_{51k}$, $L_{52k}$, $L_{53k}$ obtained in step S504 (step S505).

Then, processor 205 determines whether or not the determined spectral frequency distortion coefficient corresponds to a middle value of the three coefficients (step S506).

When the spectral frequency distortion coefficient providing the most similar distance does not correspond to the middle value in step S506, processor 205 determines whether or not the coefficient providing the most similar distance corresponds to a maximum value of the three distortion coefficients (step S508). When the spectral frequency distortion coefficient corresponds to the maximum value, processor 205 adds $\Delta\alpha_2$ to all of the three distortion coefficients to be calculated (step S509), and returns to the spectral frequency distortion calculation of step S502. The $\Delta\alpha_2$ is preferably 0.001 to 0.1000 when a sampling frequency of speech sounds is 10 kHz, and the present embodiment employs $\Delta\alpha_2=0.02$. When the spectral frequency distortion coefficient does not correspond to the maximum value, processor 205 subtracts 0.02 from all of the three distortion coefficients to be calculated (step S510), and returns to the spectral frequency distortion calculation of step S502. Step S502 through step S510 are repeated until it is determined that the spectral frequency distortion coefficient providing the most similar distance corresponds to the middle value of the three distortion coefficients in step S506. When the spectral frequency distortion coefficient corresponds to the middle value, speaker adaptation processor 205 determines that the spectral frequency distortion coefficient is an optimum distortion coefficient (step S507), and finishes its process.

Speech recognition unit 206 receives, from acoustic analysis unit 202, a second utterance part of the LPC cepstral coefficient vector obtained by acoustically analyzing the utterance by the user. Unit 206 also receives, from pattern selection unit 204, the trained pattern to be selected determined by pattern selection unit 204 and the recognition result of the vocabulary indicating the controlled device. Unit 206 further receives, from speaker adaptation processor 205, the spectral frequency distortion coefficient determined by processor 205. Unit 206 performs the distortion calculation of spectral frequency for the received second utterance part of the LPC cepstral coefficient vector using the spectral frequency distortion coefficient determined by processor 205. At this time, unit 206 finds a distance between an actual word and a device control word registered in word lexicon 208. In other words, unit 206 determines, using the simplified Mahalanobis' distance equation, the distances between all device control words and actual words of the devices for which a distance for the second utterance by the user has been selected. When category 2 is selected and the LPC cepstral coefficient vectors for control words 1 through 30 for the optimum spectral frequency distortion coefficient are $X_1$ through $X_{30}$, distance L is determined as follows.

$$L_{5nk} = \sum_{i,time} B_{5k_i} - 2\vec{A}_{5k_i}^t \cdot \vec{X}_n$$

where;

$$\vec{A}_{5k} = \vec{W}^{-1} \cdot \vec{\mu}_{5k} - \vec{W}^{-1} \cdot \vec{\mu}_x$$

$$B_{5k} = \vec{\mu}_{5k}^t \cdot \vec{W}^{-1} \cdot \vec{\mu}_{5k} - \vec{\mu}_x^t \cdot \vec{W}^{-1} \cdot \vec{\mu}_x$$

$\vec{\mu}_{5k}$ is an average value of LPC cepstral coefficient vectors of state (k) phoneme order or time sequences) for category 2, $\vec{\mu}_x$ is an average value of LPC cepstral coefficient vectors of all utterances by training speakers in category 2, $\vec{W}$ is a covariance value of LPC cepstral coefficient vectors of all utterances by the training speakers in category 2, and $\vec{X}_n$ is an LPC cepstral coefficient vector provided by the spectral frequency distortion calculation for a device control word n, and n is 1 through 30.

In this equation, the distance is calculated assuming all utterances in the corresponding category to be the entire distribution. This calculation thus provides a more reliable distance than a calculation in which all utterance in various categories are assumed to be the entire distribution. The equation is therefore extremely effective for the recognition of a device control word.

Control signal output unit 207 receives from speech recognition unit 206 recognition results of the following vocabularies: one indicating the controlled device determined by pattern selection unit 204; and the other indicating the control content determined by speech recognition unit 206. Output unit 207 supplies a signal indicating the control content to the controlled device.

The present invention uses one kind of device control word files 210—part of word lexicon 608, but different kind of device control word files may be used for each controlled device. In this case, a number of vocabularies used for comparing distances is limited, so that a recognition time can be reduced, and yet, recognition performance is improved.

The voice controller shown in FIG. 2 except for sound input unit 201 and control signal output unit 207 is hereinafter called speech recognition apparatus 211.

Table 1 shows speech recognition performance, in the case that only one device control word "Television" and 30 device control words such as "Channel one" and "Increase sound" are prepared. The recognition performance is represented by speech recognition ratios. This test was performed under a noise environment in which a signal-to-noise (S/N) ratio was 15 dB, and a sampling frequency of speech sound was set at 10 kHz.

TABLE 1

| | Ages of users | | |
|---|---|---|---|
| Adaptation methods | 12 or lower | 13 through 64 | 65 or higher |
| No adaptation | 78.7% | 88.7% | 82.3% |
| Adaptation by only pattern selection | 84.4% | 89.2% | 84.5% |
| Adaptation by only vocal tract length normalization by distortion of spectral | 86.8% | 93.9% | 83.9% |
| Adaptation by pattern selection and distortion of spectral frequency | 90.0% | 94.6% | 87.5% |

The adaptation methods in Table 1 are described.

In the case of "No adaptation", a single trained pattern is used, all training speakers are not categorized, and spectral frequency of a user's speech sound is not distorted.

In the case of "Adaptation by only pattern selection", trained patterns are generated in response to ages of speakers, and pattern by-characteristic selection unit 204 selects a trained pattern. Spectral frequency of a user's speech sound is not distorted.

In the case of "Adaptation by only distortion of spectral frequency", a single trained pattern is used and all training speakers are not categorized, similarly to the case of "No adaptation". While, speaker adaptation processor 205 distorts spectral frequency of a user's speech sound.

In the case of "Adaptation by pattern selection and distortion of spectral frequency" in coincidence with the present invention, trained patterns are generated in response to ages of speakers. Pattern by-characteristic selection unit 204 selects a trained pattern. Also, speaker adaptation processor 205 distorts spectral frequency of a user's speech sound.

Comparison of these methods results in effectiveness of "Adaptation by pattern selection and distortion of spectral frequency", for all age groups, namely 12 or lower, 13 through 64, and 65 or higher.

In the present embodiment, the stored trained patterns on pattern by-characteristic storage 203 are categorized according to ages of training speakers. However, the trained patterns may be categorized according to regions where the training speakers live or lived for the longest time, or mother tongues of the training speakers.

In the present embodiment, a microphone and a voice controller are integrated, and a control signal is sent to each controlled device. However, a microphone and a voice controller may be incorporated in each device.

Additionally, speech recognition apparatus 211 in coincidence with the present embodiment has pattern selection word file 209 which includes the pattern selection words as known words, as a part of word lexicon 208. However, without file 209, the most similar category can be selected in this way: the most similar speech sound elements and every speech sound of the first utterance are lined up, then the distances between these two lines are compared.

Exemplary embodiment 2

Figure 6:
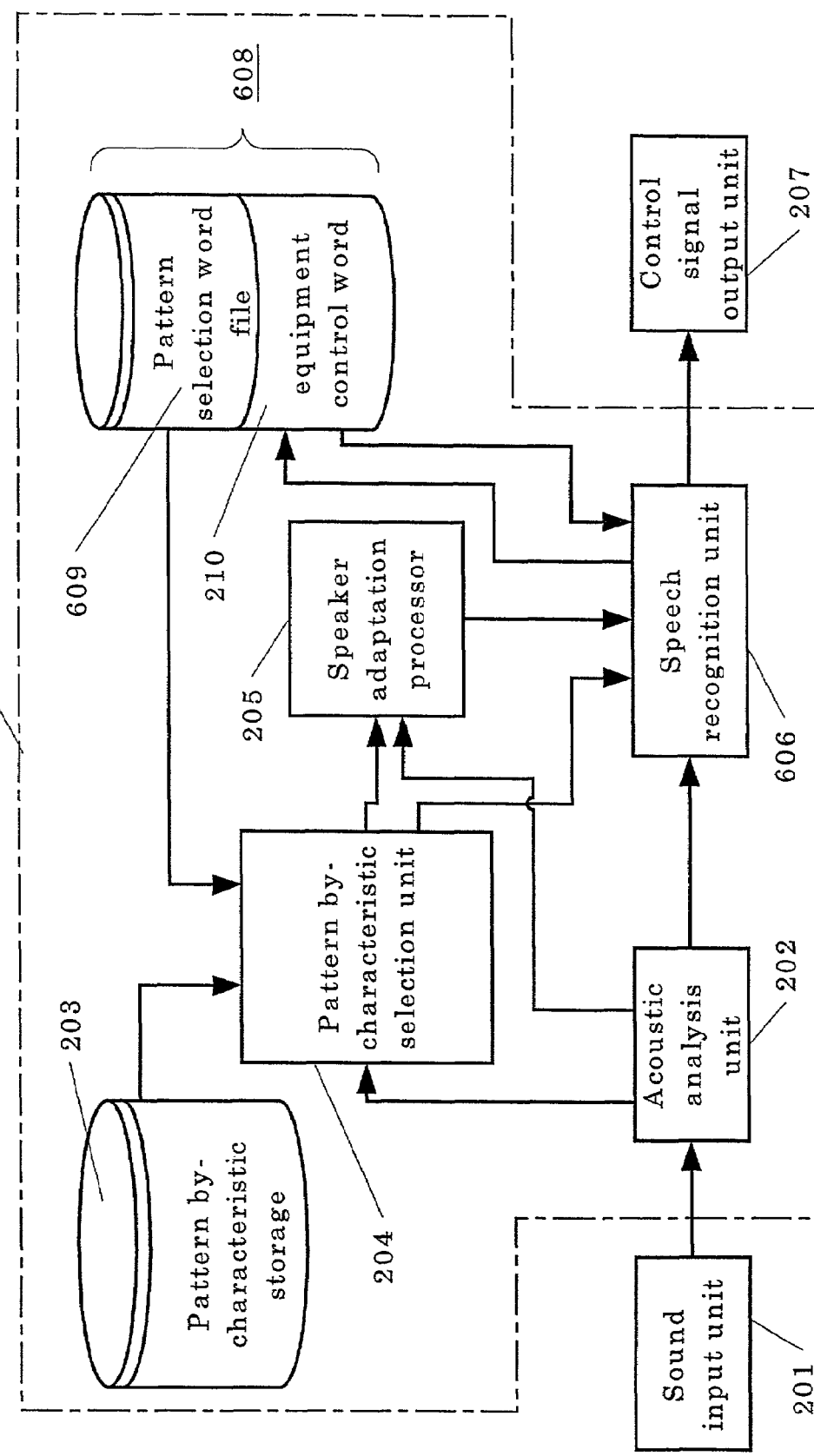
FIG. 6 is a block diagram of a voice controller in coincidence with a second exemplary embodiment of the present invention.

FIG. 6 shows a second exemplary embodiment. This embodiment differs from exemplary embodiment 1 in that a user can arbitrarily register a pattern selection word in pattern selection word file 609. The other points remain the same as those in exemplary embodiment 1.

For registering a new name for a device, a user speaks word "Register" as a first utterance. Word "Register" is previously stored as a recognized word in word lexicon 208. Speech recognition unit 606 is transferred into a vocabulary registering mode in response to the utterance. Pattern by-characteristic selection unit 204 recognizes "Register" as a pattern selection word similarly to the recognition of the first utterance in embodiment 1. Simultaneously with the recognition, pattern selection unit 204 determines trained patterns, and speaker adaptation unit 205 determines a distortion coefficient of speech sound spectral frequency. The trained pattern and the distortion coefficient are used for later speech recognition. Speech recognition unit 606 performs, using the distortion coefficient, a spectral frequency distortion calculation for an LPC cepstral coefficient vector of a next new name spoken by the user, for example, "Lamp". Phonemes are arranged and fitted from the trained patterns to be selected so that phonemic inconsistency does not occur, thereby obtaining an acoustic unit arrangement corresponding to the utterance of "Lamp". Speech recognition unit 606 stores this pattern arrangement or a character string "Lamp" converted from the arrangement on word lexicon 608. The arrangement or the character string is set to be a new pattern selection word for a first utterance The registered pattern selection word is used from now on for speech recognition similarly to the other pattern selection words. Even if a user speaks "Lamp_Turn off" instead of "Light_Turn off", for example, the user can obtain the same result. When a device control word is previously defined to every device, the newly registered pattern selection word must be related to a device control word.

In embodiment 2, pattern selection unit 204 determines trained patterns to be selected based on an utterance "Register". However, a previously defined typical trained pattern may be used for reducing total time of the registering process.

Exemplary Embodiment 3

Figure 7:
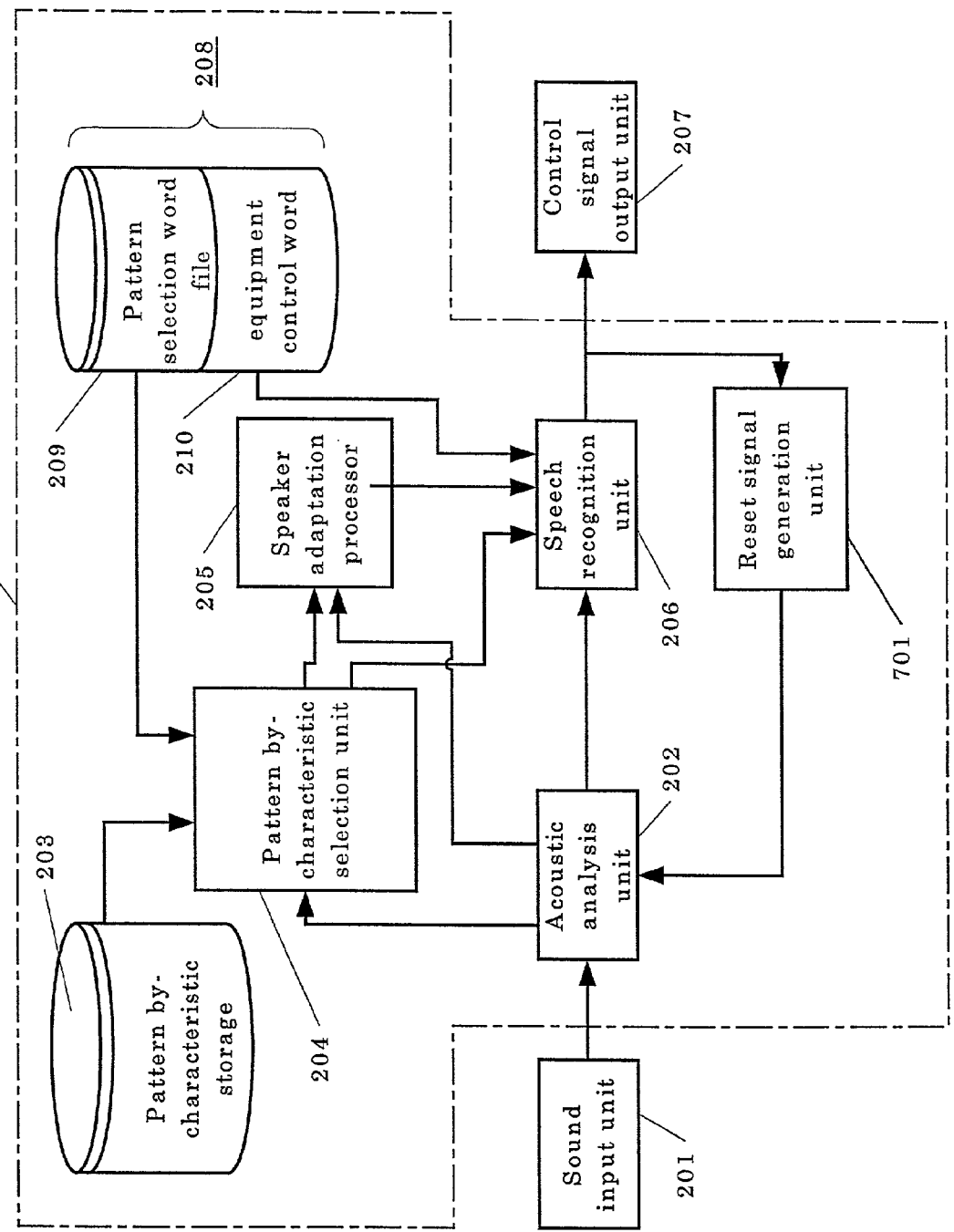
FIG. 7 is a block diagram of a voice controller in coincidence with a third exemplary embodiment of the present invention.

FIG. 7 shows a third exemplary embodiment. A process is added to exemplary embodiment 1. It is a process for resetting the trained pattern selected by a user's first utterance and a distortion coefficient of speech sound spectral frequency and for setting a user's next utterance to be a first utterance.

Reset signal generation unit 701 detects an output from speech recognition unit 206 to control signal output unit 207, and informs acoustic analysis unit 202 of the completion of the user's utterance for device control.

Acoustic analysis unit 202, when it receives this notification, resets the receiving state. Unit 202 moves to the following mode: unit 202 sets next input speech sound from sound input unit 201 to be a first utterance by the user, and supplies an LPC cepstral coefficient vector to pattern by-characteristic selection unit 204 and speaker adaptation processor 205. The user always speaks a pattern selection word such as a device name and a device control word in a pair, thereby operating the device in high recognition accuracy.

Embodiment 3 uses the output from speech recognition unit 206 as timing for resetting acoustic analysis unit 202. When speech recognition unit 711 makes a recognition error, this recognition error timing may be set to be a receipt timing of a reset instruction supplied from a key or the like. Additionally, the reset timing may be obtained when speech recognition unit 206 outputs nothing for a predetermined period. In this case, a timer is disposed in reset signal generation unit 701.

Speech recognition unit 711 can discriminate with reset signal generation unit 701 whether or not an utterance is a first utterance or a subsequent utterance. It is not required to always initially determine whether or not an utterance is a name of a device, differently from the conventional apparatus disclosed in Japanese Patent Application Non-examined Publication No. H5-341798. Time for a recognition process after the first utterance can therefore be reduced.

In the present invention, advantageously, the simplified and adequate speaker adaptation using less utterance has a better speech recognition performance than a conventional adaptation. The conventional adaptation is, for example, a speaker adaptation by only selection of one from a plurality of trained patterns by characteristic or by only distortion coefficient of spectral frequency of an input speech sound. The speaker adaptation in coincidence with the present invention can reduce a number of speaker trained patterns in combination with a distortion coefficient of the spectral frequency of the input speech sound. The speaker adaptation can also provide an advantage of reducing a memory capacity.

What is claimed is:

1. A speech recognition method comprising the steps of:
   (a) selecting, based on a first utterance by a speaker, adaptable trained patterns from a plurality of stored trained patterns, the plurality of stored trained patterns are classified by a characteristic of a training speaker;
   (b) finding a distortion coefficient fixed by spectral region of speech for an utterance by the speaker, based on the first utterance by the speaker and the selected trained patterns; and
   (c) recognizing an input speech sound following the first utterance by using the selected trained patterns and the distortion coefficient.

2. A speech recognition method according to claim 1 wherein the trained patterns are classified by ages of the training speakers.

3. A speech recognition method according to claim 2 wherein the trained patterns comprise
   (a) an average value of utterance for each characteristic category,
   (b) a covariance value of the utterance for each characteristic category,
   (c) an average value of each lexical unit by every speaker, and
   (d) a covariance value of the utterance by every speaker.

4. A speech recognition method according to claim 3 wherein the step (a) of selecting the adaptable trained patterns includes a distance calculation between the first utterance by the speaker and trained patterns,
   the trained patterns comprising
   (a) an average value of the utterance for each characteristic category,
   (b) the average of each lexical unit by every speaker, and
   (c) the covariance values of the utterance by every speaker.

5. A speech recognition method according to claim 4 further comprising a step of registering a vocabulary used for selecting the trained patterns.

6. A speech recognition method according to claim 4 further comprising a step of resetting usage of the selected trained patterns and the determined distortion coefficient, and using a next input speech sound as a first utterance.

7. A speech recognition method according to claim 1 wherein the trained patterns are classified by regions.

8. A speech recognition method according to claim 3 wherein the trained patterns comprise
   (a) an average value of utterance for each characteristic category,
   (b) a covariance value of the utterance for each characteristic category,
   (c) an average value of each lexical unit by every speaker, and
   (d) a covariance value of the utterance by every speaker.

9. A speech recognition method according to claim 3 wherein the step (a) of selecting the adaptable trained patterns includes a distance calculation between the first utterance by the speaker and trained patterns,
   the trained patterns comprising
   (a) an average value of the utterance for each characteristic category,
   (b) the average of each lexical unit by every speaker, and
   (c) the covariance values of the utterance by every speaker.

10. A speech recognition method according to claim 9 further comprising a step of registering a vocabulary used for selecting the trained patterns.

11. A speech recognition method according to claim 9 further comprising a step of resetting usage of the selected trained patterns and the determined distortion coefficient, and using a next input speech sound as a first utterance.

12. A speech recognition method according to claim 1, wherein the trained patterns comprise
    (a) an average value of utterance for each characteristic category,
    (b) a covariance value of the utterance for each characteristic category,
    (c) an avenge value of each lexical unit by every speaker, and
    (d) a covariance value of the utterance by every speaker.

13. A speech recognition method according to claim 12, wherein the step (a) of selecting the adaptable trained patterns includes a distance calculation between the first utterance by the speaker and trained patterns,
    the trained patterns comprising
    (a) an average value of the utterance for each characteristic category,
    (b) the average of each lexical unit by every speaker, and
    (c) the covariance values of the utterance by every speaker.

14. A speech recognition method according to claim 13 further comprising a step of registering a vocabulary used for selecting the trained patterns.

15. A speech recognition method according to claim 13 further comprising a step of resetting usage of the selected trained patterns and the determined distortion coefficient, and using a next input speech sound as a first utterance.

16. A speech recognition method according to claim 1 wherein a first utterance is a word.

17. A speech recognition method according to claim 16 wherein a first utterance is a word defined for trained pattern selection.

18. A speech recognition method according to claim 1, wherein said distortion coefficient is applied in order to create a shift in frequency of said input speech sound.

19. A speech recognition apparatus comprising:
    (a) an acoustic analysis unit for acoustically analyzing an input speech sound to find acoustic parameters;
    (b) a pattern by-characteristic storage for previously holding a plurality of trained patterns classified by characteristic of a training speaker;
    (c) a pattern by-characteristic selection unit for selecting adaptable trained patterns from the plurality of trained patterns based on a first utterance by a speaker;
    (d) a speaker adaptation processor for finding a distortion coefficient fixed by spectral region of speech for acoustic parameters of the first utterance by the speaker using the acoustic parameters and the trained patterns selected by said pattern selection unit; and
    (e) a word lexicon including known words to be recognized;
    (f) a speech recognition unit for recognizing an input speech sound following the first utterance using the distortion coefficient, the selected trained patterns and the word lexicon.

20. A speech recognition apparatus according to claim 19 wherein
(a) said pattern selection unit selects the adaptable trained patterns by distance calculation between the acoustic parameters of the first utterance by the speaker and the trained patterns, the trained patterns comprising
(a1) an average value of utterance for each characteristic category,
(a2) an average value of each lexical unit by every speaker, and
(a3) a covariance value of the utterance by every speaker,
(b) said pattern selection unit outputs the trained patterns comprising
(b1) an average value of utterance for a selected characteristic category, and
(b2) a covariance value of the utterance for the characteristic category.

21. A speech recognition apparatus according to claim 19 further comprising a pattern selection word file including known words to be selected as patterns.

22. A speech recognition apparatus according to claim 21 wherein the known words of said word lexicon respectively include known words to be recognized with a second utterance.

23. A speech recognition apparatus according to claim 21 wherein said speech recognition unit further comprises a function of registering a new vocabulary.

24. A speech recognition apparatus according to claim 19 further comprising a reset signal generation unit for resetting usage of the selected trained patterns and the obtained distortion coefficient and for using a next input speech sound as a first utterance.

25. A speech recognition apparatus according to claim 19 wherein a first utterance is a word.

26. A speech recognition apparatus according to claim 25 wherein a first utterance is a word defined for trained pattern selection.

27. A speech recognition apparatus according to claim 19, wherein said distortion coefficient is applied in order to create a shift in frequency of said input speech sound.

28. A voice controller comprising:
(a) a sound input unit for receiving a speech sound;
(b) an acoustic analysis unit for acoustically analyzing the speech sound from said sound input unit to provide acoustic parameters;
(c) a pattern by-characteristic storage for previously holding a plurality of trained patterns classified by characteristic of a training speaker;
(d) a pattern by-characteristic selection unit for selecting adaptable trained patterns from the plurality of trained patterns based on a first utterance by a speaker;
(e) a speaker adaptation processor for obtaining a distortion coefficient fixed by spectral region of speech for acoustic parameters of the first utterance by the speaker, using the acoustic s and the trained patterns selected by said pattern selection unit;
(f) a word lexicon comprising known words for recognition objects;
(g) a speech recognition unit for recognizing an input speech sound following the first utterance using
(g1) the distortion coefficient,
(g2) the selected trained patterns, and
(g3) the word lexicon; and
(h) a control signal output unit for outputting a control signal from said speech recognition unit.

29. A voice controller according to claim 28 wherein
(a) said pattern selection unit selects the adaptable trained patterns by distance calculation between the acoustic parameters of the first utterance by the speaker and the trained patterns, the trained patterns comprising
(a1) an average value of utterance for each characteristic category,
(a2) an average value of each lexical unit by every speaker, and
(a3) a covariance value of the utterance by every speaker,
(b) said pattern selection unit outputs the trained patterns comprising
(b1) an average value of utterance for a selected characteristic category, and
(b2) a covariance value of the utterance for the characteristic category.

30. A voice controller according to claim 29 wherein
(c) one word of one or a plurality of previously prepared known words is used for selecting the trained patterns, and
(d) selection of a device controlled in response to the control signal is performed using the known word.

31. A voice controller according to claim 29 wherein the known word for selecting the trained patterns can be registered by the speaker.

32. A voice controller according to claim 28 wherein
(a) one word of one or a plurality of previously prepared known words is used for selecting the trained patterns, and
(b) selection of a device controlled in response to the control signal is performed using the known ward.

33. A voice controller according to claim 28 wherein the known word for selecting the trained patterns can be registered by the speaker.

34. A voice controller according to claim 28 wherein a first utterance is a word.

35. A voice controller according to claim 34 wherein a first utterance is a word defined for trained pattern selection.

36. A voice controller according to claim 28, wherein said distortion coefficient is applied in order to create a shift in frequency of said speech sound.

* * * * *

UNITED STATES PATENT AND TRADEMARK OFFICE
CERTIFICATE OF CORRECTION

PATENT NO. : 7,003,465 B2
APPLICATION NO. : 09/975,918
DATED : February 21, 2006
INVENTOR(S) : Keiko Morii et al.

It is certified that error appears in the above-identified patent and that said Letters Patent is hereby corrected as shown below:

In column 13, line 50 of the Letters Patent, in claim 8, "according to claim 3" should read --according to claim 7--

In column 13, line 59, of the Letters Patent, in claim 9, "according to claim 3" should read --according to claim 8--

Signed and Sealed this

Twenty-second Day of August, 2006

JON W. DUDAS
*Director of the United States Patent and Trademark Office*